UNITED STATES PATENT OFFICE.

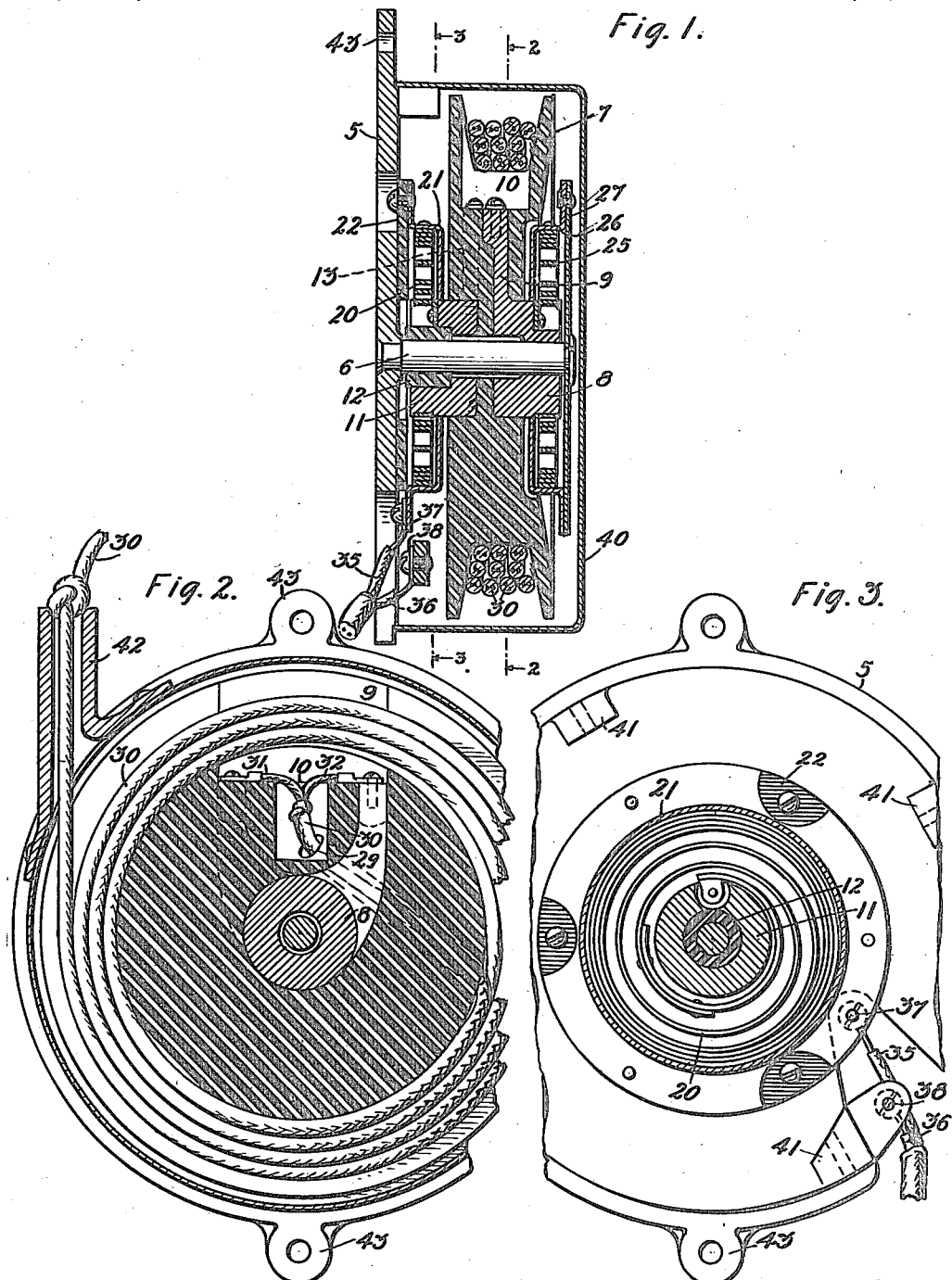

JOSEPH ZWILLING, OF NEW YORK, N. Y., ASSIGNOR TO WESTERN ELECTRIC COMPANY, INCORPORATED, OF NEW YORK, N. Y., A CORPORATION OF NEW YORK.

REELING DEVICE.

1,247,358.

Specification of Letters Patent. Patented Nov. 20, 1917.

Application filed July 5, 1916. Serial No. 107,553.

*To all whom it may concern:*

Be it known that I, JOSEPH ZWILLING, a citizen of the United States, residing at New York, in the county of Bronx and State of New York, have invented certain new and useful Improvements in Reeling Devices, of which the following is a full, clear, concise, and exact description.

This invention relates to reeling devices for automatically winding a conductor or cord, such as a telephone cord, upon a reel when the cord is not in use, and for permitting the drawing out of the cord whenever desired.

It is an object of this invention to provide such a device through which electrical connections may be permanently made without liability of interruptions in continuity of the circuit.

Another object of this invention is to provide such a device which may be of few parts, easily and readily assembled, of sturdy construction, and of small size so that it will occupy as little space as possible.

In accordance with this invention there is provided a reel of insulating material carrying circuit terminals and mounted upon a shaft carried by a base. Springs, which are wound up as the cord carried by the reel is unwound and serve to wind the cord upon the reel when the tension on the cord is released, form a portion of the electrical circuit.

A better and more comprehensive understanding of this invention may be had by reference to the following description taken in connection with the drawings, wherein Figure 1 is a view in section of the reeling device embodying this invention; Fig. 2 is a view on line 2—2 of Fig. 1; and Fig. 3 is a view on line 3—3 of Fig. 1.

Referring to the drawings, 5 is a metal base to which is staked a shaft 6. A reel 7 of insulating material is provided with a metal hub 8 having an extension 9, the end of which terminates in a small chamber 10 provided by cutting away a portion of the inner periphery of the reel 7. The reel 7 is provided with a second metal hub 11, insulated from the shaft 6 by an interposed bushing 12. The hub 11 likewise has an extension 13, the end of which also terminates in the chamber 10. The reel 7 with its hubs 8 and 11 is loosely mounted on the shaft 6.

The inner end of a flat spiral spring 20 is attached to the side of the hub 11, while the outer end thereof is secured to a metal cover 21 which forms part of a suitable casing. This cover 21 is attached to an insulating plate 22 which is rigidly secured to the base 5, the insulating plate 22 and the metal cover 21 forming the casing for the spring 20. The inner end of a second flat spiral spring 25 is attached to the side of the hub 8, while the outer end is secured to a metal cover 26 of a casing for the spring 25. This cover 26 is attached to a metal plate 27 rigidly secured to the shaft 6, the metal plate 27 and cover 26 forming a casing for the spring 25.

A cord 30, composed of two conductors 31 and 32, may be wound on the reel 7, the inner end of the cord passing through an opening 29 extending from the inner periphery of the reel into the chamber 10. Here the cord is knotted to hold it in place and prevent undue strain on the individual conductors. The conductor 31 is attached to the extension 13 of the hub 11, while the conductor 32 is attached to the extension 9 of the hub 8 by means of terminal screws. Outside circuit leads 35 and 36 may be connected to the reeling device by means of circuit terminals 37 and 38, terminal 37 being provided on the metal cover 21, and terminal 38 being provided on the base 5. The circuit through the reeling device and cord carried thereby may be traced from conductor 35, through circuit terminal 37, metal cover 21, spring 20, hub 11, and extension 13 thereof, cord conductor 31, the telephone attached to the other end of the cord conductors, cord conductor 32, extension 9 of hub 8, spring 25, metal cover 26 and plate 27, shaft 6, base 5, circuit terminal 38 and conductor 36.

A cover 40, provided for the working parts of the reeling device, is attached to the base 5 by means of screws engaging the cover and lugs 41, 41 provided on the base. An outlet 42 for the cord 30 is secured to and fits over an opening in the cover 40.

The base 5 is provided with lugs 43, 43 by means of which, with the aid of screws, the reeling device may be mounted in the desired position.

If the outer end of the cord 30 be drawn out of the reeling device, the reel 7 will be rotated against the action of the springs 20 and 25, which will be wound up, so that upon the release of the cord, the springs will rotate the reel in the opposite direction, causing the cord to be drawn into the reeling device and wound upon the reel. At no time, however, will the operation of the reel affect the continuity of the circuits including the conductors 31 and 32.

What is claimed is:

A cord reeling device, comprising a base, a spindle projecting from said base, a reel having a plurality of hubs of conducting material adapted to rotate on said spindle, means to insulate one of said hubs from said spindle, a pair of coil springs, one end of each of said coil springs connected to one of said hubs and the other end thereof connected to a stationary casing member, means for securing one of said casings to said spindle, means for securing the other of said casings to the base, means for insulating the second mentioned casing from the said base, and means for electrically connecting the conductors carried by said reel with said hubs.

In witness whereof, I hereunto subscribe my name this 3rd day of July A. D., 1916.

JOSEPH ZWILLING.